Oct. 11, 1949.　　　　　E. J. INGALLS　　　　　2,484,511
CENTRIFUGAL ROTARY LAWN MOWER BLADE
Filed Oct. 29, 1948　　　　　　　　　　　　2 Sheets-Sheet 1
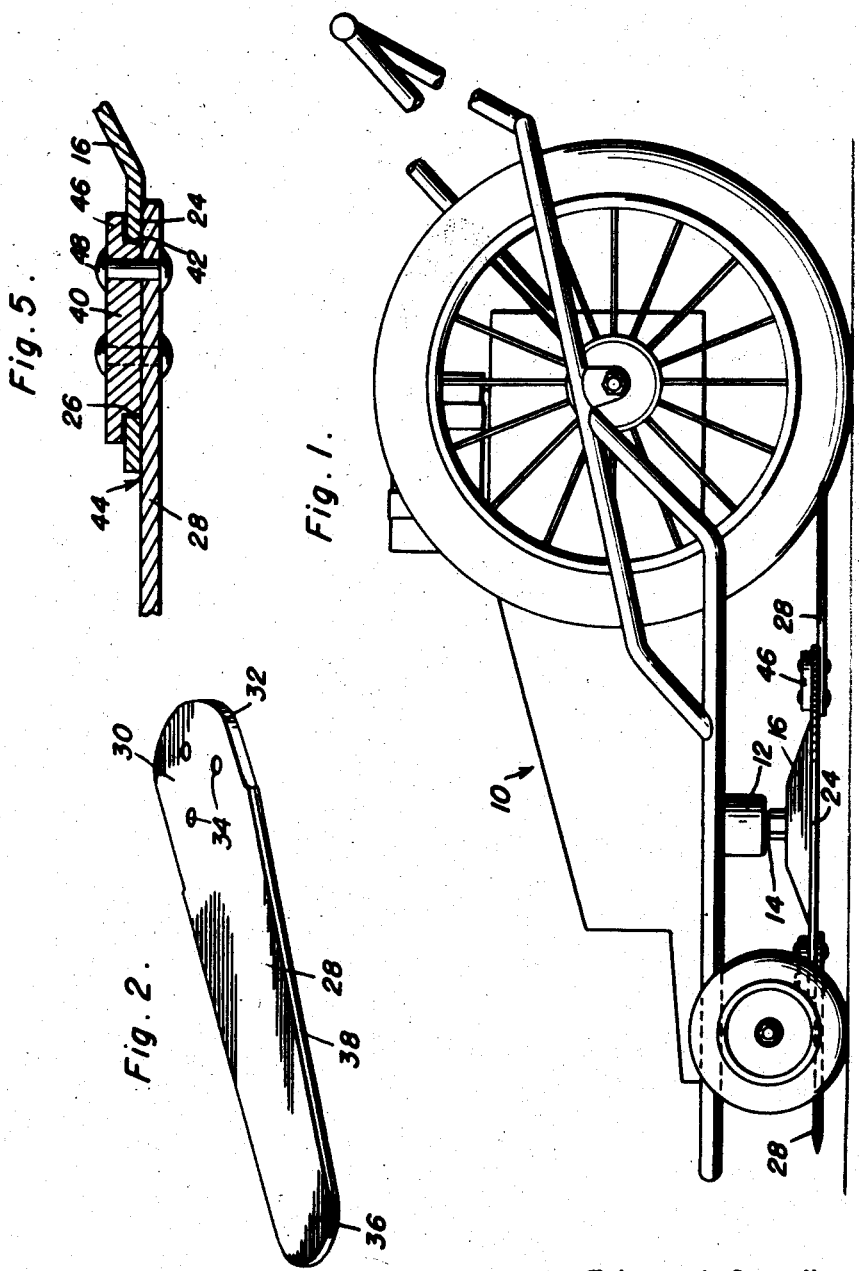
Edgar J. Ingalls
INVENTOR.

Oct. 11, 1949.  E. J. INGALLS  2,484,511
CENTRIFUGAL ROTARY LAWN MOWER BLADE
Filed Oct. 29, 1948  2 Sheets-Sheet 2
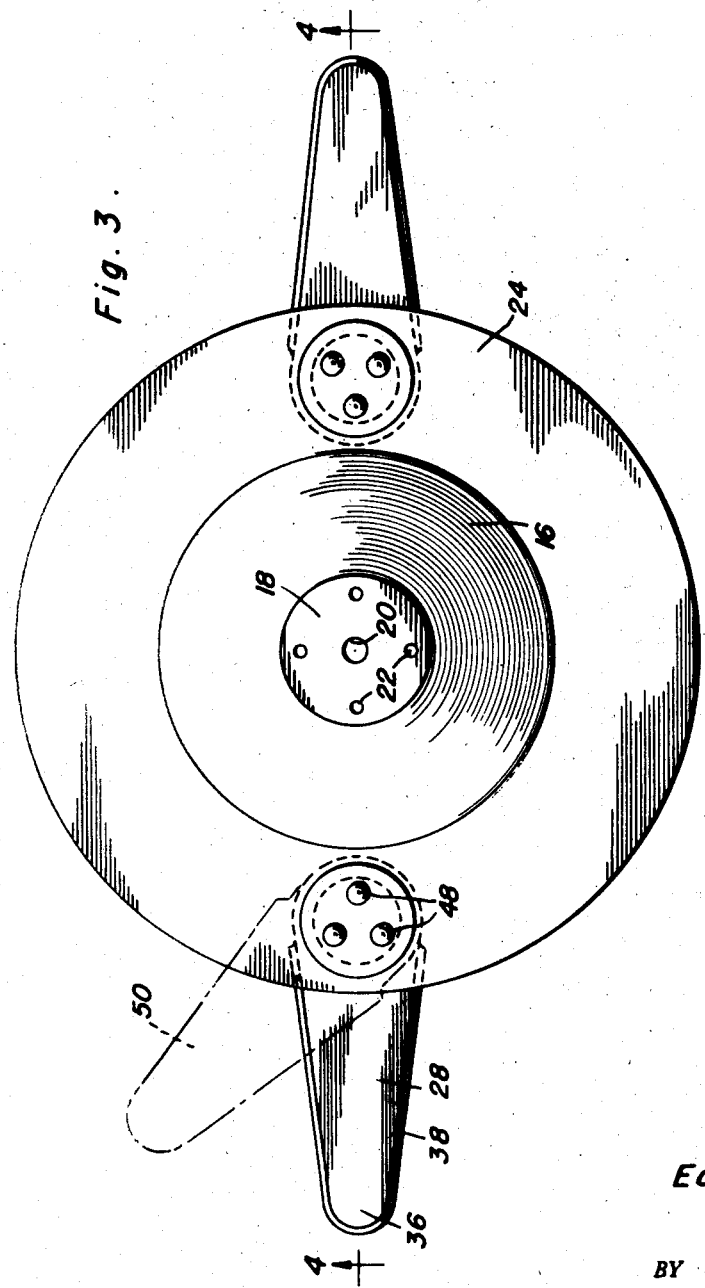
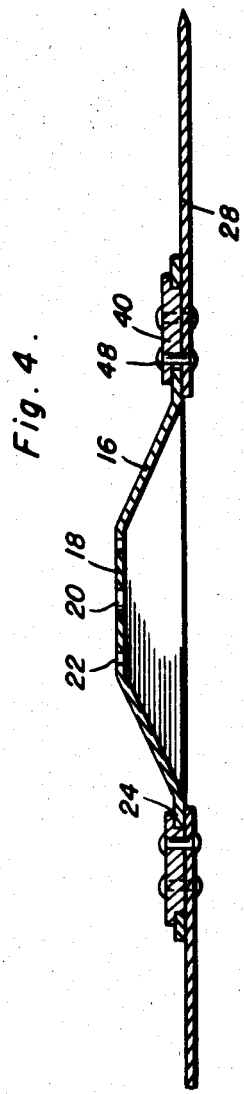
Edgar J. Ingalls
INVENTOR.

Patented Oct. 11, 1949

2,484,511

UNITED STATES PATENT OFFICE 2,484,511

CENTRIFUGAL ROTARY LAWN MOWER BLADE

Edgar J. Ingalls, Zachary, La., assignor of fifty per cent to Fabio G. Halphen, Jr., Baton Rouge, La.

Application October 29, 1948, Serial No. 57,236

2 Claims. (Cl. 56—25.4)

This invention comprises novel and useful improvements in a centrifugal rotary lawn mower blade and more specifically pertains to an improved pivoted blade for a rotary disk type lawn mower, wherein the blade is yieldable when encountering an obstruction during operation of the lawn mower, and is centrifugally urged into its radially extending and operative position.

The principal object of this invention resides in the provision of an improved lawn mower blade for lawn mowers of the rotary disk type, wherein the cutting elements or blades of the device shall be of light weight, easily and readily applied to or removed from the cutting head of the lawn mower for servicing or sharpening, and wherein the blade shall be readily yieldable when encountering an obstruction, in order to prevent damage to the blades, the cutting head or the power driving means of the mower.

An important feature of the invention resides in the provision of a disk-like, inverted cup-shaped cutting head of a conventional design carried by the vertical shaft of a well known type or form of rotary lawn mower, having one or more, preferably one or more pairs of diametrically oppositely disposed blades pivoted to the flange of the rotary cutting head, in such manner that the blades are freely pivotal upon the head and may be centrifugally urged into their radially extending or projected position therefrom, and yet are swingable into the confines of the outer perimeter of the head in order to permit yielding of the blades when an obstruction is encountered during operation of the mower.

Another important feature of the invention resides in the particular construction of the blades, which are preferably of light weight, of thin, flexible, metal plate construction, and which are tapering in width, narrowing from their pivoted ends towards their outer ends, which latter outer ends are rounded, and wherein the entire perimeter of the blades forms a continuous beveled knife-like edge.

A still further feature of the invention resides in the provision of bearing apertures in a perimetric flange of the rotary cutting head of the machine, together with disk-like bearing members secured to the pivotal ends of the blades and loosely and rotatably received in the apertures of the flange, which bearing members serve to loosely and pivotally retain the blades upon the flange of the cutter head.

These, together with the various other ancillary objects and features to be later set forth, are attained by the present invention, a preferred embodiment of which has been illustrated by way of example in the accompanying drawings, wherein:

Figure 1 is a fragmentary side elevational view, showing a rotary disk type of lawn mower of a conventional design to which the principles of this invention have been applied;

Figure 2 is a perspective view of one of the improved cutter blades forming the subject matter of this invention;

Figure 3 is a top plan view of the rotary cutter head showing a pair of blades applied thereto, and in dotted lines one of the blades in a pivoted position as when yielding after encountering an obstruction as set forth hereinafter;

Figure 4 is a vertical transverse sectional view taken substantially upon the plane of the section line 4—4 of Figure 3; and, Figure 5 is a detailed view in vertical transverse section, upon an enlarged scale, the clearances between said parts being exaggerated in order to emphasize the loose fit and the mounting construction between one of the blades, a part of the flange of the rotary head and the fastening means for journalling and securing the blade to the head.

Referring now more specifically to the accompanying drawings, wherein like numerals designate similar parts throughout the various views, there is indicated at 10 in Figure 1 a lawn mower of any conventional type having the usual wheeled or portable foot supporting frame upon which is mounted a suitable source of power, not shown, and provided with a depending boss 12 through which extends a vertically disposed cutter shaft 14 having a disk like inverted cup-type of cutter head 16 secured to the lower end thereof.

If desired, this cutter head could be vertically adjusted upon the shaft 14 in various known manners in order to properly position the cutter blades for effective operation upon grass or the like.

As will be more apparent from Figure 4, the cutter head 16 consists of a frusto-conical portion having a central annular plate 18 provided with an axial aperture 20 for receiving the vertical shaft 14 therethrough. It is contemplated that the plate 18 shall be abutted against and thus rigidly secured to a flange or shoulder upon the shaft 14 in accordance with conventional design, and for this purpose the plate 18 is provided with suitable apertures 22 which assist in positioning and rigidly securing the cutter head to the shaft as by means of fastening bolts, dowel pins or the like.

At its lower annular edge, the head 16 is provided with an annular horizontally extending flange 24 which is provided with a suitable number of apertures 26, as shown in Figure 5.

Obviously, any suitable number of these apertures can be provided, for pivotally or rotatably mounting cutter blades upon the perimeter or periphery of the cutter head so that as the head rotates the radially extended blades will operate as sickle knives to shear or cut the grass or other vegetation with which the mower is employed. In some instances a single cutter blade could be employed, so that one shearing operation is performed for each revolution of the cutter heads; but it is preferred to utilize a plurality of blades and apertures and preferably to dispose these in diametrical position and oppositely related pairs in order to obtain a balancing effect upon the cutter head and the blades.

Attention is now directed more particularly to Figure 2 for an illustration of one of the cutter blades, 28, whose construction and mounting forms the essential features of this invention. The blade 28 which may be of any flexible material such as sheet metal or the like of an elongated nature, is provided with an inward portion or hub 30 having a rounded periphery 32 and provided with a plurality of apertures 34 by means of which the blade is mounted as set forth hereinafter. At its outer end, 36, the blade is rounded as shown and it will be noted and is of particular importance that the blade shall taper in width from its relatively narrow outer end to its relatively broad inner end adjacent the ends of the rim 32 of the hub portion 30.

It is extremely important that the blades shall be of relatively light and economical construction in order that there shall be no great inertia or resistance to the blade pivoting and yielding when encountering an obstruction, and to further reduce the cost of the blade and the expense of replacing damaged blades.

However, as will be evident from the following description, it is a relatively simple matter to remove a blade 28 and to sharpen the cutting edge 30 thereof.

As will be evident from Figure 4, it is intended that the blade shall be pivoted to the undersurface of the annular flange 24 of the cutter head so that the blade may extend rigidly outwardly from the flange during rotation of the head, whereby the edge 38 will operate as a knife or cutter; but the blade may be pivoted in its bearing aperture 26 to assume various angular positions and even be disposed entirely within the circumference of the flange in order to avoid or yield to obstacles when the same are encountered and also to fold the blades inwardly to make a more compact article for shipping, packing or the like.

As will be more clearly seen in the enlarged and exaggerated view of Figure 5, a bearing member 40 in the form of a button or the like is mounted upon the hub portion 30 of a blade 28, and the shank 42 of this bearing member 40 is received within the aperture 26 with an appreciable clearance therebetween as set forth in Figure 5. Thus, the bearing member 40 has a loose fit end and is readily rotatable within the aperture 26.

The length of the shank portion 42 is greater than the thickness of the flange 24, so that the shank extends entirely through the flange and a clearance 44 is provided between the flange 24 and the upper surface of the knife blade 28.

The bearing member 40 is further provided with an annular flange 46 at its upper end, which flange overlies the aperture 26 and the flange 24, and with the aid of rivets 48, bolts, or other suitable fastening means, serves to clamp the blade 28 loosely to the flange 24. Since the length of the shank 42 is greater than the thickness of the flange 24, no binding action can occur between the lower surface of the annular shoulder 46, the upper surface of the blade 28, and the upper and lower surface of the flange 24.

It will thus be seen that each knife blade is firmly and securely fastened to but is freely pivoted upon the flange, whereby under the urge of centrifugal force the blades may be radially extended as shown in Figure 3 during operation of the mower, but when a blade encounters an obstacle or obstruction the blade may be yieldably pivoted to its dotted line position as shown at 50 in Figure 3.

From the foregoing, the construction, operation and manifest advantages of the invention will be readily perceived and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having described the invention, what is claimed as new is:

1. In a lawn mower, a supporting frame, a shaft rotatably mounted on said frame, a cutter head fixed to said shaft, a cutter blade, pivot means securing said blade to said head adjacent the periphery thereof and actuatable by centrifugal force into a radially projecting position, said blade being swingable into a position wholly within the periphery of said head to effect yielding of the blade when encountering an obstruction, said head having an outer perimetric flange, a bearing aperture in said flange, a bearing on said blade journalled in said aperture and retaining means for loosely retaining said bearing in said aperture and said blade to said head.

2. The combination of claim 1 wherein said blade directly and slidably engages the under surface of said flange and said bearing extends through said aperture and is provided with a shoulder overlying said flange to form said retaining means.

EDGAR J. INGALLS.

REFERENCES CITED

The following references are of record in the file of this patent:

UNITED STATES PATENTS

| Number | Name | Date |
|---|---|---|
| 1,868,918 | Schenk | July 26, 1932 |